US012748587B2

(12) United States Patent
Beaudet et al.

(10) Patent No.: US 12,748,587 B2
(45) Date of Patent: Sep. 29, 2026

(54) SYSTEM AND METHOD FOR ISSUE COLLABORATIVE TRACKING

(71) Applicant: TURBULENT MEDIA INC., Montreal (CA)

(72) Inventors: Marc Beaudet, Montreal (CA); Benoit Beausejour, Montreal (CA)

(73) Assignee: TURBULENT MEDIA INC., Montreal (CA)

(*) Notice: Subject to any disclaimer, the term of this patent is extended or adjusted under 35 U.S.C. 154(b) by 232 days.

(21) Appl. No.: 18/284,277

(22) PCT Filed: Mar. 25, 2022

(86) PCT No.: PCT/CA2022/050449
§ 371 (c)(1),
(2) Date: Sep. 26, 2023

(87) PCT Pub. No.: WO2022/198333
PCT Pub. Date: Sep. 29, 2022

(65) Prior Publication Data
US 2024/0160434 A1 May 16, 2024

Related U.S. Application Data

(60) Provisional application No. 63/166,614, filed on Mar. 26, 2021.

(51) Int. Cl.
*G06F 8/70* (2018.01)
*G06Q 10/10* (2023.01)

(52) U.S. Cl.
CPC ............. *G06F 8/70* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 7,225,139 | B1 | 5/2007 | Tidwell et al. | |
| 10,489,728 | B1 * | 11/2019 | Siconolfi | G06N 3/08 |
| 2009/0193046 | A1 | 7/2009 | Desai et al. | |

(Continued)

FOREIGN PATENT DOCUMENTS

EP 0981921 B1 11/2009

OTHER PUBLICATIONS

International Search Report and Written Opinion received for PCT Patent Application No. PCT/CA2022/050449, mailed on Jun. 29, 2022, 11 pages.

*Primary Examiner* — Lewis A Bullock, Jr.
*Assistant Examiner* — Mark A Gooray
(74) *Attorney, Agent, or Firm* — STINSON LLP

(57) ABSTRACT

A method for tracking of issues in a software development process. The method comprises: receiving a request for submitting a new development issue; creating a temporary issue entry; receiving a first set of user-provided information pertaining to the new development issue; storing the first set of user-provided information within the temporary issue entry; determining, from an originating issue database, a first set of potentially duplicate originating issue entries; and if a selection of a given one of the first set of potentially duplicate originating entries is received, storing, in the originating issue database, the temporary issue entry as a new contribution sub-entry of the given selected originating issue entry.

19 Claims, 5 Drawing Sheets

(56) References Cited

U.S. PATENT DOCUMENTS

| | | | | |
|---|---|---|---|---|
| 2017/0039253 | A1 | 2/2017 | Bond | |
| 2019/0026697 | A1* | 1/2019 | Burton | G06F 8/71 |
| 2020/0210934 | A1* | 7/2020 | Bar-on | G06Q 10/063114 |

* cited by examiner

SYSTEM AND METHOD FOR ISSUE COLLABORATIVE TRACKING

CROSS-REFERENCE TO RELATED APPLICATIONS

This application is a national stage application under 35 U.S.C. § 371 of International Application PCT/CA2022/050449, filed Mar. 26, 2022, which claims priority under 35USC § 119 (e) of US provisional patent application(s) 63/166,614, filed on Mar. 26, 2021, which are hereby incorporated by references herein in their entireties.

TECHNICAL FIELD

The present disclosure generally relates to a system and method for tracking of issues in the ongoing development process of a software application. More particularly, the system and method allow involvement of users of the software who are not necessarily part of the development team, while reducing duplication of issues submitted by the users.

BACKGROUND

The treatment of software issues, commonly known as software "bugs", is an important part of the software development procedure. This process includes the identification and reporting of issues which allows the subsequent prioritizing and addressing of the issues by the developers of the software application.

For example and without being limitative, the issues can include the software application operating incorrectly or "crashing" in different scenarios. More precisely, typical issues found in a video game can include the game crashing under various scenarios, certain game elements not loading, or game characters (ex: non-playable characters) acting in an unexpected manner.

In practice, software issues are most often treated by the software development team developing the software. Hence, in such cases, issues can be identified and reported by developers or testers who are part of the development team.

In certain cases, users of the software who are external to the development team can also participate in the identification and reporting of the issues. Indeed, it was observed that users of a software application can be an important source of information for identifying and describing issues that arise in the use of the software application. In fact, in many cases, users will voluntarily report the issues that they encounter, such that the issues can be addressed by the developers of the software application. This has been found to be particularly the case in the field of video games where the involvement of community of users in the reporting issues is especially prevalent, such that users (ex: "garners") actively report bugs as they discover them while playing the video game.

It was however observed that there is a lack of organized and collaborative processes for the users to report the issues and for the developers to monitor and track the issues being reported, which can lead to frustration for both the users and the developer.

Referring to FIG. 1, there is illustrated a schematic diagram representing the typical (prior art) process for software users to report issues discovered in the software application and for a development team to identify and track issues. Users 8 are users of the software application, which can include use-only users 8*a* (i.e. those who only use the software application, but are not part of the development team for the software application) and internal users 8*b* (i.e. those who are part of the development team of the software application).

In some embodiments, users 8 can communicate directly with the developers, for example by writing to a technical support email address. Such communications are not visible to other users. Therefore, two users 8 who encounter the same issue will not know that another user also encountered that issue. The developers will therefore be notified twice of the same issue and will need to identify that that separate communications from two users pertain to the same issue.

In other embodiments, the users 8 can also report issues that they encounter by submitting information on public spaces, such as social media platforms 16 and/or online forums 20. While the use of public spaces for reporting identified issues offers the benefit of allowing collaboration between users 8, in that once an issue is posted, other users 8 can provide additional information about the issue by responding to the post or thread, this most often happens in a disorganized manner. For example, if a first user 8 posts about an issue on a first social media platform 16*a* and a second user 8 uses a second social media platform 16*b* and posts about the same issue on the second social media platform 16*b*, two separate posts will exist for the same issue. Even in the case of a single social media platform 16*a*, 16*b*, a user 8 will often post about an issue that they encounter without first verifying if the issue has previously been reported in an earlier post by another user, which can therefore also lead to existence of multiple posts identifying the same issue. It will be appreciated that this leads to a proliferation of reports of issues, many of which may be duplicate reports for the same issue.

While the internal development team, as represented by internal user 8*b*, has the benefit of accessing an internal issue tracking platform 24 that stores identified issues in an issue database 32 (such as, for example and without being limitative Jira™, by Atlassian Inc.), which allows for tracking and managing issues stored in an internal database 32 in an organized manner by the development team, there remains the task of importing of issues reported via the social media platforms 16 and online forums 20 into the internal issue database 32. It was observed that since the information pertaining to issues are reported in an unstructured and disorganized manner on the social media platforms 16 and online forums 20, especially since the same issue may be reported multiple times, the importing of issues into the issue database 32 remains a difficult and cumbersome task.

In view of the above, there is a need for an improved system and method for tracking of issues in the ongoing development process of a software application which, by virtue of its design and components, would be able to overcome or at least minimize some of the above-discussed prior art concerns.

One skilled din the art will understand that the improved system and method for tracking of issues in the ongoing development process of a software application answers to a computer problem by structuring the data related to identified issues and preventing or at least minimizing duplicate issue entries being stored in the corresponding database, thereby efficiently managing data storage size. such as to allow better functioning of the associated computing device. As will be described in more details below the improved system and method for tracking of issues in the ongoing development process of a software application also allows automated prioritization of the reported issue.

SUMMARY

According to a first general aspect, there is provided a method for tracking of issues in a software development process. The method comprises: receiving, from a first user, a request for submitting a new development issue; in response to the request, creating a temporary issue entry; receiving, from the first user, a first set of user-provided information pertaining to the new development issue; storing the first set of user-provided information within the temporary issue entry; in response to receiving the first set of user-provided information pertaining to the new development issue, determining, from an originating issue database, a first set of potentially duplicate originating issue entries. The originating issue database is a structured database with an internal structure including fields for storing originating issue entries, top level issue sub-entries, contribution sub entries and issue parameters, where each originating issue can be associated to one top level issue sub-entry and one or more contribution sub entries, each being associated to issue parameters defined by the user-provided information and where each originating issue entry corresponds to a previously identified development issue, and each potentially duplicate originating issue entry represent a potential duplicate of the new development issue defined by the first set of user-provided information. The method further comprises: if a selection of a given one of the first set of potentially duplicate originating entries is received, storing, in the originating issue database, the temporary issue entry as a new contribution sub-entry of the given selected originating issue entry.

In an embodiment, the method further comprises: receiving, from the first user, a supplementary set of user-provided information pertaining to the new development issue; storing the supplementary set of user-provided information within the temporary issue entry; and in response to receiving the supplementary set of user-provided information pertaining to the new development issue, determining, from the originating issue database, an updated set of potentially duplicate originating issue entries, each potentially duplicate originating issue entry of the updated set representing a potential duplicate of the new development issue defined by a combination of the first set of user-provided information and the supplementary set of user-provided information.

In an embodiment, the method further comprises: if a selection of a given one of the new set of potentially duplicate originating entries is received, storing, in the originating issue database, the temporary issue entry as a new contribution sub-entry of the given selected originating issue entry of the new set of potentially duplicate originating entries.

In an embodiment, the method further comprises determining, for the selected given one of the potentially duplicate originating issue entries, an issue metric based on the issue parameters entries defined by the user-provided information stored in the new contribution sub-entry of the originating issue database and on one or more of issue parameters entries defined by the user-provided information associated to other contribution sub-entries of the originating issue database and to the top level issue sub-entry of the originating issue database, for the corresponding originating issue entry.

In an embodiment, the method further comprises: if a complete set of user-provided information pertaining to the new development issue is received without receiving a selection of one of the potentially duplicate originating issue entries, storing, in the originating issue database, the temporary issue entry as a top-level issue entry of a new originating issue entry.

In an embodiment, the new originating issue entry is unassociated with any other originating issue entries of the originating issue database.

In an embodiment, the method further comprises: receiving, from a second user, a for-contribution selection of a given one of the originating issue entries stored in the originating issue database and a request to make a contribution to the for-contribution selected originating issue entry; in response to the request to make the contribution, creating a contribution sub-entry within the for-contribution selected given one of the originating issue entries in the originating issue database; receiving and storing a set of for-contribution user-provided information pertaining to the contribution as issue parameter entries, within the newly created contribution sub-entry.

In an embodiment, the method further comprises: determining, for the for-contribution selected given one of the originating issue entry, an issue metric based on the issue parameters entries defined by the user-provided information stored in the new contribution sub-entry of the originating issue database, and on one or more of issue parameters entries defined by the user-provided information associated to other contribution sub-entries of the originating issue database and to the top level issue sub-entry of the originating issue database, for the corresponding originating issue entry.

In an embodiment, the set of for-contribution user-provided information pertaining to the contribution for the given one of the originating issue entries includes one of a validation of the given one of the originating issue entries or an invalidation of the given one of the originating issue entries.

In accordance with another general aspect, there is provided a computer readable memory having recorded thereon statements and instructions, which, when executed by a processor, causes the processor to perform the above described steps of the method.

In accordance with another general aspect, there is also provided a system for tracking of issues in a software development process. The system comprises: at least one processor; at least one memory coupled to the processor and storing statements and instructions executable by the processor, which when executed by the processor causes the processor to perform operations comprising: receiving, from a first user, a request for submitting a new development issue; in response to the request, creating a temporary issue entry; receiving, from the first user, a first set of user-provided information pertaining to the new development issue; storing the first set of user-provided information within the temporary issue entry; in response to receiving the first set of user-provided information pertaining to the new development issue, determining, from an originating issue database, a first set of potentially duplicate originating issue entries. The originating issue database is a structured database with an internal structure including fields for storing originating issue entries, top level issue sub-entries, contribution sub entries and issue parameters, where each originating issue can be associated to one top level issue sub-entry and one or more contribution sub entries, each being associated to issue parameters defined by the user-provided information and where each originating issue entry corresponds to a previously identified development issue, and each potentially duplicate originating issue entry represent a potential duplicate of the new development issue defined by the first set of user-provided information. The statements and instructions executable by the processor, when executed by the processor also causes the processor to perform operations comprising: if a selection of a given one of the first set of potentially duplicate originating entries is received, storing, in the originating issue database, the temporary issue entry as a new contribution sub-entry of the given selected originating issue entry.

In an embodiment, the at least one memory coupled to the processor stores statements and instructions executable by the processor, which when executed by the processor causes the processor to further perform operations comprising: receiving, from the first user, a supplementary set of user-provided information pertaining to the new development issue; storing the supplementary set of user-provided information within the temporary issue entry; in response to receiving the supplementary set of user-provided information pertaining to the new development issue, determining, from the originating issue database, an updated set of potentially duplicate originating issue entries, each potentially duplicate originating issue entry of the updated set representing a potential duplicate of the new development issue defined by a combination of the first set of user-provided information and the supplementary set of user-provided information.

In an embodiment, the at least one memory coupled to the processor stores statements and instructions executable by the processor, which when executed by the processor causes the processor to further perform operations comprising: if a selection of a given one of the new set of potentially duplicate originating entries is received, storing, in the originating issue database, the temporary issue entry as a new contribution sub-entry of the given selected originating issue entry of the new set of potentially duplicate originating entries.

In an embodiment, the at least one memory coupled to the processor stores statements and instructions executable by the processor, which when executed by the processor causes the processor to further perform operations comprising: determining, for the selected given one of the potentially duplicate originating issue entries, an issue metric based on the issue parameters entries defined by the user-provided information stored in the new contribution sub-entry of the originating issue database and on one or more of issue parameters entries defined by the user-provided information associated to other contribution sub-entries of the originating issue database and to the top level issue sub-entry of the originating issue database, for the corresponding originating issue entry.

In an embodiment, the at least one memory coupled to the processor stores statements and instructions executable by the processor, which when executed by the processor causes the processor to further perform operations comprising: if a complete set of user-provided information pertaining to the new development issue is received without receiving a selection of one of the potentially duplicate originating issue entries, storing, in the originating issue database, the temporary issue entry as a top-level issue entry of a new originating issue entry.

In an embodiment, the at least one memory coupled to the processor stores statements and instructions executable by the processor, which when executed by the processor causes the processor to further perform operations comprising: receiving, from a second user, a for-contribution selection of a given one of the originating issue entries stored in the originating issue database and a request to make a contribution to the for-contribution selected originating issue entry; in response to the request to make the contribution, creating a contribution sub-entry within the for-contribution selected given one of the originating issue entry in the originating issue database; receiving and storing a set of for-contribution user-provided information pertaining to the contribution as issue parameter entries, within the newly created contribution sub-entry.

In an embodiment, the at least one memory coupled to the processor stores statements and instructions executable by the processor, which when executed by the processor causes the processor to further perform operations comprising: determining, for the for-contribution selected given one of the originating issue entry, an issue metric based on the issue parameters entries defined by the user-provided information stored in the new contribution sub-entry of the originating issue database, and on one or more of issue parameters entries defined by the user-provided information associated to other contribution sub-entries of the originating issue database and to the top level issue sub-entry of the originating issue database, for the corresponding originating issue entry.

In an embodiment, the set of for-contribution user-provided information pertaining to the contribution for the given one of the originating issue entries includes one of a validation of the given one of the originating issue entries or an invalidation of the given one of the originating issue entries.

In accordance with another general aspect, there is provided a system for tracking of issues in a software development process. The system comprises: a collaborative issue tracking platform; a originating issue database being a structured database with an internal structure including fields for storing originating issue entries, top level issue sub-entries, contribution sub entries and issue parameters, where each originating issue can be associated to one top level issue sub-entry and one or more contribution sub entries, each being associated to issue parameters defined by user-provided information, each originating issue entry corresponding to a previously identified development issue. The collaborative issue tracking platform is configured to: receive a request for submitting a new development issue; in response to the request, create a temporary issue entry; receive a first set of user-provided information pertaining to the new development issue; store the first set of user-provided information within the temporary issue entry; in response to receiving the first set of user-provided information pertaining to the new development issue, determine, from the originating issue database, a first set of potentially duplicate originating issue entries, each potentially duplicate originating issue entry representing a potential duplicate of the new development issue defined by the first set of user-provided information; and if a selection of a given one of the first set of potentially duplicate originating entries is received, store in the originating issue database the temporary issue entry as a new contribution sub-entry of the given selected originating issue entry.

In an embodiment, the collaborative issue tracking platform is further configured to: receive a supplementary set of user-provided information pertaining to the new development issue; store the supplementary set of user-provided information within the temporary issue entry; in response to receiving the supplementary set of user-provided information pertaining to the new development issue, determine, from the originating issue database, an updated set of potentially duplicate originating issue entries, each potentially duplicate originating issue entry of the updated set representing a potential duplicate of the new development issue defined by a combination of the first set of user-provided information and the supplementary set of user-provided information.

In an embodiment, the collaborative issue tracking platform is further configured to: if a selection of a given one of the new set of potentially duplicate originating entries is received, store in the originating issue database the temporary issue entry as a new contribution sub-entry of the given selected originating issue entry of the new set of potentially duplicate originating entries.

In an embodiment, the collaborative issue tracking platform is further configured to: determine, for the selected given one of the potentially duplicate originating issue entries, an issue metric based on the issue parameters entries defined by the user-provided information stored in the new contribution sub-entry of the originating issue database and on one or more of issue parameters entries defined by the user-provided information associated to other contribution sub-entries of the originating issue database and to the top level issue sub-entry of the originating issue database, for the corresponding originating issue entry.

In an embodiment, the collaborative issue tracking platform is further configured to: if a complete set of user-provided information pertaining to the new development issue is received without receiving a selection of one of the potentially duplicate originating issue entries, store in the originating issue database the temporary issue entry as a top-level issue entry of a new originating issue entry.

In an embodiment, the collaborative issue tracking platform is further configured to: receive a for-contribution selection of a given one of the originating issue entries stored in the originating issue database and a request to make a contribution to the for-contribution selected originating issue entry; in response to the request to make the contribution, create a contribution sub-entry within the for-contribution selected given one of the originating issue entry in the originating issue database; receive and store a set of for-contribution user-provided information pertaining to the contribution as issue parameter entries, within the newly created contribution sub-entry.

In an embodiment, the collaborative issue tracking platform is further configured to: determine, for the for-contribution selected given one of the originating issue entry, an issue metric based on the issue parameters entries defined by the user-provided information stored in the new contribution sub-entry of the originating issue database, and on one or more of issue parameters entries defined by the user-provided information associated to other contribution sub-entries of the originating issue database and to the top level issue sub-entry of the originating issue database, for the corresponding originating issue entry.

In an embodiment, the set of for-contribution user-provided information pertaining to the contribution for the given one of the originating issue entries includes one of a validation of the given one of the originating issue entries or an invalidation of the given one of the originating issue entries.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION

Figure 1:
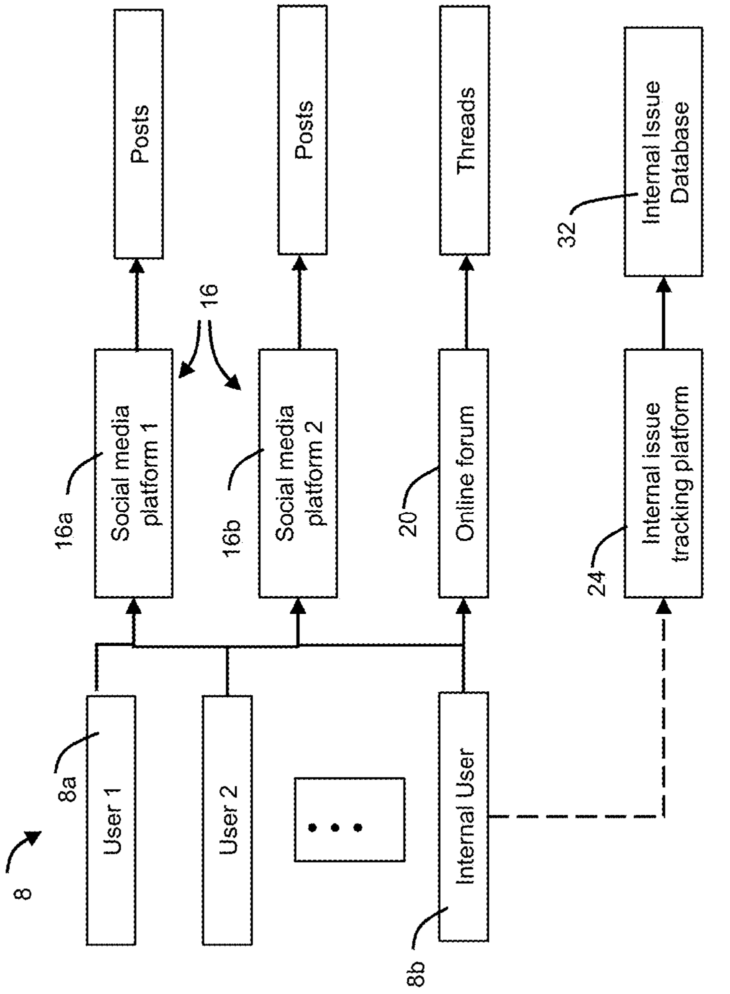
FIG. 1 (Prior Art)
FIG. 1 illustrates a schematic diagram representing the typical process for software users to report issues in a software application and for a development team to identify and track issues.

In the following description, the same numerical references refer to similar elements. The embodiments, geometrical configurations, materials mentioned and/or dimensions shown in the figures or described in the present description are embodiments only, given solely for exemplification purposes.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Moreover, although the embodiments of the system for tracking of issues in the ongoing development process of a software application and corresponding parts thereof consist of certain configurations as explained and illustrated herein, not all of these components are essential and thus should not be taken in their restrictive sense. It is to be understood, as also apparent to a person skilled in the art, that other suitable components and cooperation thereinbetween may be used for the system, as will be briefly explained herein and as can be easily inferred herefrom by a person skilled in the art.

Moreover, although the associated method includes steps as explained and illustrated herein, not all of these steps are essential and thus should not be taken in their restrictive sense. It will be appreciated that the steps of the method described herein may be performed in the described order, or in any suitable order. In an embodiment, steps of the proposed method are implemented as software instructions and algorithms, stored in computer memory and executed by processors. It should be understood that servers and computers are therefore required to implement to proposed system, and to execute the proposed method. In other words, the skilled reader will readily recognize that steps of the method can be performed by programmed computers. In view of the above, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

The term "computing device" is used to encompass computers, servers and/or specialized electronic devices which receive, process and/or transmit data. "Computing devices" are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

One skilled in the art will therefore understand that each such computing device typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computing devices. Where a computer system includes multiple computing devices, these devices can, but need not, be co-located. In some embodiments, a computer system can be a cloud-based computing system whose processing resources are shared by multiple distinct business entities or other users.

The terms "a", "an" and "one" are defined herein to mean "at least one", that is, these terms do not exclude a plural number of items, unless stated otherwise.

Unless stated otherwise, the terms "connected" and "coupled", and derivatives and variants thereof, refer herein to any structural or functional connection or coupling, either direct or indirect, between two or more elements. For example, the connection or coupling between the elements can be acoustical, mechanical, optical, electrical, thermal, logical, or any combinations thereof.

The terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

In view of the above, one skilled in the art will understand that the collaborative issue tracking described herein according to various example embodiments may be implemented as methods, apparatus, systems, computing devices, computing entities, and/or the like. As such, embodiments may take the form of an apparatus, system, computing device, computing entity, and/or the like executing instructions stored on a computer-readable storage medium to perform certain steps or operations. However, embodiments of the present invention may also take the form of an entire hardware embodiment performing certain steps or operations. Such devices can each comprise at least one processor, a data storage system (including volatile and non-volatile memory and/or storage elements). For example, and without limitation, the programmable computer may be a programmable logic unit, a mainframe computer, server, personal computer, cloud-based program or system, laptop, personal data assistant, cellular telephone, smartphone, wearable device, tablet device, virtual reality devices, smart display devices (ex: Smart TVs), set-top box, video game console, or portable video game devices.

Embodiments of the present system and method for tracking of issues in the ongoing development process of a software application are described below with reference to block diagrams and flowchart illustrations. Thus, it should be understood that each block of the block diagrams and flowchart illustrations, respectively, represent conceptual views of illustrative circuitry embodying the principles disclosed herein and may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

Figure 2:
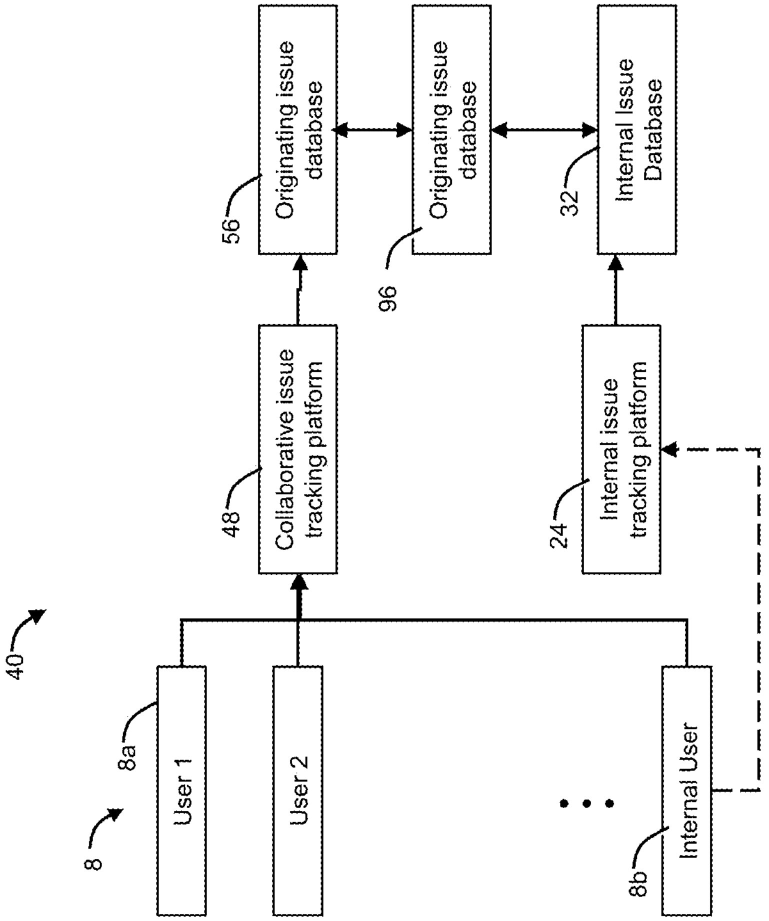
FIG. 2 illustrates a schematic diagram representing a collaborative issue tracking system having a collaborative issue tracking platform and an originating issue database according to an example embodiment.

Referring to FIG. 2, there is illustrated is a schematic diagram representing a collaborative issue tracking system 40 having a collaborative issue tracking platform 48 and an originating issue database 56 according to one example embodiment. Once again, in the schematic diagram of FIG. 2, the users 8 can include both use-only users 8*a* and internal user 8*b* which can access the collaborative issue tracking platform 48 linked to the originating issue database 56. The collaborative issue tracking platform 48 is accessible using a computing device and is configured to provide a user portal that allows the users 8 to submit information pertaining to an issue that they have discovered. For example and without being limitative, the information relative to the discovered issue can be submitted via selection of options in forms, text entries, uploading of photo/video/documents, etc., using a graphical user interface of the collaborative issue tracking platform 48. In an embodiment, at least a portion of the information such as, for example and without being limitative the version of the software application and/or specification of the user's hardware, can also be retrieved automatically by the collaborative issue tracking platform 48.

In an embodiment, the collaborative issue tracking platform 48 can be accessed separately from the software application for which issues are being reported. In this case, a user portal provided by the collaborative issue tracking platform 48 and defining the graphical user interface can take the form of a website, a mobile app or the like, being accessed using a user computing device. In an embodiment, the software publisher can communicate access information of the user portal of the collaborative issue tracking platform 48 (ex: URL link or mobile app name for download from a mobile app store) to users of the software application, to allow them to access the collaborative issue tracking platform 48.

In an alternative embodiment, the collaborative issue tracking platform 48 can be embedded within the software application. For example and without being limitative, in an embodiment, the user portal of the collaborative issue tracking platform 48 can be accessed from a menu (ex: a video game menu) from within the software application. One skilled in the art will understand that, in such an embodiment, the graphical user interface of the user portal of the collaborative issue tracking platform 48 can have the same look-and-feel as other visual components of the software application.

Still referring to FIG. 2, the data containing the information pertaining to issues reported by users 8 via the collaborative issue tracking platform 48 is stored in the originating issue database 56. As will be described in more details below, the originating issue database 56 is configured to store the information pertaining to issues in a hierarchy of originating issue entries and contribution sub-entries. This hierarchy of originating issue entries and contribution sub-entries allows multiple users to collaboratively provide information pertaining to a same issue, while reducing or avoiding duplicate issue entries being stored in the originating issue database 56.

Figure 3:
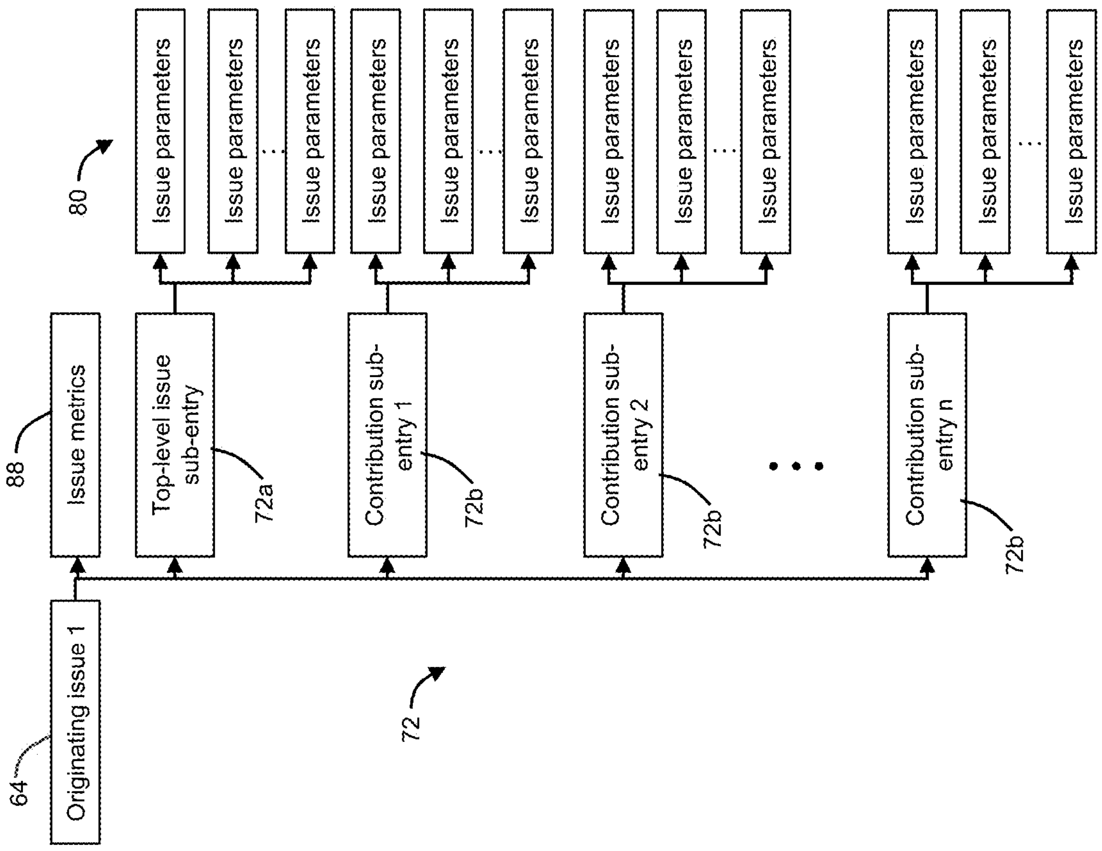
FIG. 3 illustrates a schematic diagram showing the data entries for one originating issue entry of the originating issue database of the collaborative issue tracking system according to an example embodiment.

Referring now to FIG. 3, there is illustrated is a schematic diagram showing the data entries for one originating issue entry 64 of the originating issue database 56, in accordance with an embodiment. As will be described in more details below, the collaborative issue tracking platform 48 and the originating issue database 56 are configured such that the originating issue entry 64 defines a single issue in the software application, whereby information reported by multiple users from multiple occurrences or instances of a same issue are stored within the same originating issue entry 64.

The originating issue entry 64 stores one or more contribution sub-entry 72, with each contribution sub-entry 72 corresponding to one instance of information submission pertaining to the issue identified by one user 8. Each contribution sub-entry 72 includes a respective set of issue parameters entries 80, which stores the information submitted by one user. As mentioned above, the information submitted by one user can be information entered manually by the user 8, using the graphical user interface of the user portal of the collaborative issue tracking platform 48, information retrieved automatically by the collaborative issue tracking platform 48, or a combination thereof, regarding the identified issue.

In view of the above, it will be appreciated that for a given single software issue represented by the originating issue entry 64, there can therefore be a plurality of contribution sub-entries 72. Each one of the plurality of contribution sub-entries 72 corresponds to an instance of that specific issue experienced by a user 8. Information specific to each user's experience of that issue is stored in the issue parameters 80 associated to each corresponding contribution sub-entry 72. In view of the above, it will be appreciated that the architecture of the originating issue database 56 therefore allows a collection of information pertaining to the same issue to be stored in an associated manner, within a single originating issue entry 64.

According to one example embodiment, and as illustrated in FIG. 3, the contribution sub-entry 72 includes a top-level issue sub-entry 72*a* and a plurality of subsequent contribution sub-entries 72*b*. The top-level issue sub-entry 72*a* stores the information (in the form of issue parameters 80) submitted by a user 8 that first reported the issue represented by the originating issue entry 64 and that led to the creation of the originating issue 64. Each subsequent contribution sub-entry 72*b* stores the information (in the form of its issue parameters 80) submitted by each user 8 that also experienced the same issue and chose to associate their issue reporting to the originating issue entry 64.

For example and without being limitative, in an embodiment, the issue parameters 80 defined for the top-level issue sub-entry 72*a* and each one of the contribution sub-entries 72*b* can include one or more instance of the following non-exhaustive list of possible issue parameters 80:

Issue identifier;

Hardware specifications;

Game configuration;

Game version;

Issue Severity;

Reproduction steps;

Workaround;

Image/Video/document Evidence;

Commentary;

Vote to validate the issue;

Identification of other relevant originating issue.

Below is a non-limiting, representative example of contribution sub-entries 72 of an originating issue entry 64 which can be stored in the originating issue database 56, relative to a video game issue identified as "Game crashes to desktop, within minutes of gameplay" (parameters of particular importance are indicated with a representative value underlined to highlight their importance for this specific issue):

Top level issue sub-entry

| Parameter name | Parameter entry |
|---|---|
| Hardware specifications; | Specification 1 |
| Game configuration; | Configuration 1 |
| Game version; | Game version 1 - <u>Version 3.2</u> |
| Issue Severity; | Severity level 1 |
| Reproduction steps; | Reproduction steps 1 |
| Workaround; | Workaround 1 |
| Image/Video Evidence; | Image/Video Evidence 1 |
| Commentary; | Commentary 1 |
| Other relevant originating issue. | |

| Contribution sub-entry 1 | |
|---|---|
| Parameter name | Parameter entry |
| Hardware specifications; | Specification 2 - Low-end video card; |
| Game configuration; | Configuration 2 |
| Game version; | Game version 2 - version 2.8 |
| Issue Severity; | Severity level 2 |
| Reproduction steps; | Reproduction steps 2 |
| Workaround; | Workaround 2 |
| Image/Video Evidence; | Image/Video Evidence 2 |
| Commentary; | |
| Vote to validate | YES |
| Other relevant originating issue. | |

| Contribution sub-entry 2 | |
|---|---|
| Parameter name | Parameter entry |
| Hardware specifications; | Specification 3; |
| Game configuration; | Configuration 3 - running game ultra-high settings; |
| Game version; | Game version 3 - version 3.2 |
| Issue Severity; | Severity level 3 |
| Reproduction steps; | Reproduction steps 3 - crashes only after playing other video game beforehand |
| Workaround; | Restart computer before launching game |
| Image/Video Evidence; | Image/Video Evidence 3 |
| Commentary; | |
| Vote to validate | NO |
| Other relevant originating issue. | |

Continuing with FIG. 3, in an embodiment, the collaborative issue tracking platform 48 is configured to determine an issue metrics entry 88 for each one of the originating issue entry 64. The issue metrics entry 88 includes one or more data metrics determined from aggregation of information stored in the issue parameters entries 80 across all of the contribution sub-entries 72 of the associated originating issue 64. The issue metrics entry 88 therefore is used to provide issue-wide information about the issue, by combining information across multiple contribution sub-entries 72. For example and without being limitative, the issue metrics entry 88 can include an average of the "issue severity" parameters of the multiple contribution sub-entries 72, thereby being representative of the level of severity for all the users that have experienced and reported that issue. In another embodiment, the issue metrics entry 88 can include a count of "YES" validation votes versus a count of "NO" validation votes, thereby being representative of how valid users having reported the issue feel that the issue actually is. One skilled in the art will understand that data metrics can be determined for the issue metrics entry 88, as appropriate, depending on the issue parameters 80 that are stored for each contribution sub-entry 72*b* of the specific originating issue 64.

It will be appreciated that the issue metrics entry 88 can be determined or updated repeatedly at specific intervals or in real time or quasi real time, as the issue parameters entries 80 of the contribution sub-entries 72*b* are updated and/or as new contribution sub-entries 72 with corresponding issue parameters are created in the originating issue database 56, as additional instances of reporting of issues are made by users using the collaborative issue tracking platform 48.

In an embodiment, the collaborative issue tracking platform 48 is configured to automatically determine a priority of each one of the originating issues 64 based on the issue metrics entry 88 thereof.

In view of the above, in an embodiment the originating issue database 56 is a structured database configured with an internal structure including fields for storing originating issues 64, issue metrics entries 88, top level issue sub-entries 72*a*, contribution sub entries 72*b* and issue parameters 80. In the originating issue database 56, each originating issue 64 can be associated to one top level issue sub-entry 72*a* and multiple contribution sub entries 72*b*. The corresponding issue parameters 80 are associated to each top level issue sub-entries 72*a* and contribution sub entries 72*b*. In an embodiment, each originating issues 64 is also associated to a corresponding issue metrics entry 88 of the originating issue database 56.

Returning now to FIG. 2, according to one example embodiment, the originating issue database 56 can be connected to the internal issue database 32 used by the development team, thereby allowing data communication between the originating issue database 56 of the collaborative issue tracking platform 48 and the internal issue database 32 of an internal issue tracking platform 24. Such data communication therefore allows information relative to the reported issues stored in the originating issue database 56 to be imported into the internal issue database 32 of the internal issue tracking platform 24, for subsequent management and tracking of the issues by the software development team, using the internal issue tracking platform 24.

For example, in an embodiment, an issue entry can be created in the internal issue database 32 for each originating issue entry 64 of the originating issue database. Any updates made to the originating issue entry 64, such as from the creation of new contribution sub-entries 72, can also cause corresponding updates to the corresponding issue entry in the internal issue database 32. It will be appreciated that this provides an automatic importation of information submitted by use-only users into the internal issue database 32, such that the development team can immediately access that information.

Similarly, in an embodiment, updates to the internal issue database 32 performed in response to the use of the internal issue tracking platform 24, can also be reflected in the corresponding originating issue entry 64 within the originating issue database 56. For example and without being limitative, the status of the treatment of an issue indicated in the internal issue database 32 can be imported to the originating issue database 56, such that the collaborative issue tracking platform 48 can display the status of the issue corresponding to the originating issue entry 64. Hence, use-only users (especially those who reported the issue) can be made aware via the collaborative issue tracking platform 48 of the status of the treatment of the issue.

Still referring to FIG. 2, in an embodiment, the system 40 includes a connector 96 operating as a bridge for connecting the originating issue database 56 and the internal issue database 32. In an embodiment, the connector 96 is configured to perform synchronization operations between the originating issue database 56 and the internal issue database 32 by exporting data from the originating issue database 56 to the internal issue database 32 and vice versa. The connector 96 can be configured to perform data export from the originating issue database 56 to the internal issue database 32 or from the internal issue database 32 to the originating issue database 56, either upon detection of an update to the originating issue database 56 or the internal issue database 32 or at predetermined intervals (for example at fixed time interval or the like). In an embodiment, the connector 96 is further configured to perform field mapping and data formatting between the data of the originating issue database 56 and the internal issue database 32, to connect the two structured databases 56, 32 having a different structure. Hence, in an embodiment data transformation such as, for example and without being limitative, mathematical operations on different fields, concatenation of information from multiple fields, formatting of data to a specific target format, or the like can be performed to import data from fields of the originating issue database 56 to corresponding fields of the internal issue database 32 or vice-versa.

Figure 4:
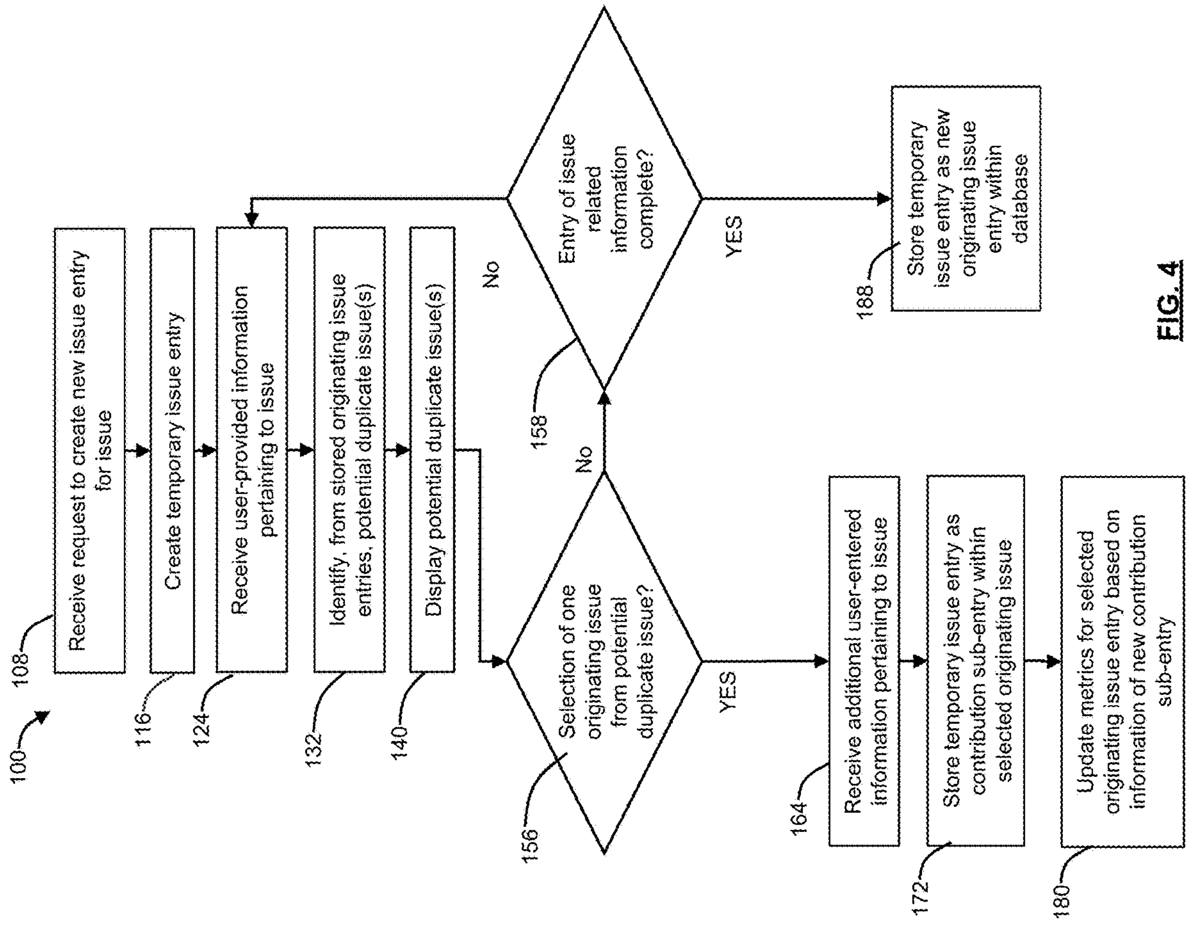
FIG. 4 illustrates a flowchart showing the operational steps of a process for submitting an issue in a collaborative issue tracking method according to an example embodiment.

Referring now to FIG. 4, there is illustrated is a flowchart showing the operational steps of a method 100 for submitting an issue to be inserted into the originating issue database 56 via the collaborative issue tracking platform 48 according to one example embodiment. As mentioned above, in an embodiment, the method can be a computer-implemented method performed by the collaborative issue tracking platform 48.

At step 108, the method 100 can include the step of receiving a request for creating a new issue entry for an issue for a given software application. For example and without being limitative, in an embodiment, step 108 can be performed in response to a user data input, inputted by a first use-only user, accessing a portal presented by the collaborative issue tracking platform 48, using a computing device. At the time of making the request, the first user has not considered whether an originating issue entry for this issue already exists within the originating issue database 56.

At step 116, in response to receiving the request to create a new issue entry at step 108, a temporary issue entry is temporarily created.

At step 124, a first set of user-provided information pertaining to the new development issue is received. For this step, one or more data entry pages can be presented to the first user, as he/she is navigating the portal presented by the collaborative issue tracking platform 48, using the computing device. The user can provide the information via date entry forms, fields, menus, or the like presented on the data entry pages. One skilled in the art will understand that the user-provided information can correspond to the issue parameters 80 that will ultimately be stored within the originating issue database 56. The received user-provided information can therefore be defined as an incomplete set of information required to fully describe the issue. In an embodiment, the received user-provided information can be stored within corresponding issue parameters of the temporary issue entry.

At step 132, in response to receiving the user-provided information, a search is performed in the originating issue database 56 to identify a set of potentially duplicate originating issue entries 64. As described hereinabove, the originating issue entries 64 of the originating issue database 56 define the individual (non-duplicated) software issues that have already been identified, from previous reporting by other users. The set of potentially duplicate originating issue entries represent a subset of the whole set of originating issue entries 64 that are identified as potentially being a duplicate of the new issue being reported by the first user. In other words, the new issue being reported is identified by the collaborative issue tracking platform 48 as potentially being a duplicate of another issue already represented in one of the originating issue entries 64 stored in the originating issue database 56. It will be appreciated that, in such a case, if another originating issue entry 64 is created for the new issue being reported by the first user, there would potentially be two originating issue entries 64 within the originating issue database 56 for the same actual issue (ex: for issue "Game crashes to desktop, within minutes of gameplay", there would be a first originating issue entry 64 that is one of the originating issue entry 64 being part of the set of potentially duplicate originating issue entries and a second originating issue entry 64 created from the issue reported by the first user).

In an embodiment, the identification of the potentially duplicate originating issue entries 64 is carried out by considering the user-provided information of step 124 in relation to the issue parameters 80 of existing originating issue entries 64 stored in the originating issue database 56. For example and without being limitative, in an embodiment the search results can be based on similarity of issue text entries defining the issue such as, for example and without being limitative: similarity of issue title; similarity of reproduction steps; similarity of description of "what happened"; similarity of description of "what should have happened"; similarity of possible workaround, etc. The search results can also be based on user behaviour data such as, for example and without being limitative: issue creation data; number of reproductions, contributions, and votes; the existence of an occurrence in the internal issue database 32 of this issue, a combination thereof, etc. The search results can further be based on keywords, metadata, categories, or the like.

In an embodiment, the identification of the potentially duplicate originating issue entries 64 can be carried out using a machine learning model configured to define a similarity score for each one of the originating issue entries 64 of the originating issue database 56. For example and without being limitative, the machine learning model can be trained using training datasets including labelled data including issue parameters 80 of originating issue entries 64. The machine learning model can be retrained over time using additional available data, thereby improving the search accuracy over time.

At step 140, the method includes displaying at least a subset of the identified potentially duplicate originating issue entries. In an embodiment, the information about at least the subset of the identified potentially duplicate originating issue is displayed within the user interface of the user portal of the collaborative issue tracking platform 48. Hence, at step 140, the identified potentially duplicate originating issue entries are made available for selection by the user using the user interface of the user portal of the collaborative issue tracking platform 48.

At step 156, the method includes determining whether a selection of one originating issue entry 64 from the set of potentially duplicating originating issue entries, identified at step 132 and displayed at step 140 has been received from the user portal of the collaborative issue tracking platform 48. As will be readily understood, the selection of an originating issue entry 64 from the set of potentially duplicating originating issue entries, identified at step 132 and displayed at step 140 is indicative the issue presently being reported would be a duplicate of the selected originating issue 64.

Accordingly, instead of having a new originating issue entry being created for the issue being reported (which would cause duplicate issue entries to exist in the originating issue database 56), the information being reported will be stored as a contribution sub-entry 72*b* within the originating issue entry 64 that has been selected (no new originating issue entry is created, thereby avoiding the creation of a duplicate issue entry).

If a selection of one originating issue entry 64 from the set of potentially duplicating originating issue is determined to have occurred at step 156, the method proceeds to step 158.

At step 164, additional user-provided information pertaining to the issue to be reported are received until the issue submission process is completed. Hence, at this step, the additional user-provided information is received based on input data inputted by the user from in data entry pages of the issue submission portal of the collaborative issue tracking platform 48. The additional user-provided information includes the information relative to the issue being reported, which was missing from the user-provided information provided at step 124, in order to define all of the data required to populate the issue parameters entries 80 of the corresponding contribution sub-entry **72*b* in the originating issue database 56**.

At step 172, the method includes storing the temporary issue entry created at step 116 (which includes the user-provided information of step 124 and additional user-provided information of step 164) in the originating issue database 56, as a new contribution sub-entry **72*b* of the selected originating issue entry 64 of step 148. As mentioned above, the stored new contribution sub-entry 72*b* has issue parameters entries 80 corresponding to the user-provided information of step 124 and additional user-provided information of step 164** formatted accordingly.

Optionally, at step 180, the method can include updating the issue-related metrics for the selected originating issue entry 64, to take into account the information contained in the new contribution sub-entry **72*b* (i.e. the issue parameters entries 80 of the new contribution sub-entry 72*b***) that was just stored as a result of the issue reporting process being completed.

Returning to step 156, in the alternative that no originating issue entry 64 from the set of potentially duplicating originating issue is determined to have occurred, the method 100 can proceed to step 148.

As illustrated, at step 148, the method includes determining whether the submission of information for the issue being reported is complete. In other words, do the user entered information provided at step 124 provide all of the data required to populate the issue parameters entries 80 of the corresponding contribution sub-entry **72*b* in the originating issue database 56. As will be defined in more details below negative answers to step 148 can lead to several iterations of step 124** being performed with additional information being acquired as part of the user entered information on each iteration.

Indeed, if at step 148 the submission of information for the issue being reported is incomplete (if step 148=NO), the method 100 returns to step 124 to receive further information provided by the first user. For example, in subsequent iterations of step 124, a supplementary set of user-provided information pertaining to the new development issue being reported is received. This supplementary set of user-provided information is also stored within issue parameters of the temporary issue entry and steps 132, 140 and 156 are performed taking into account the supplementary set of user-provided information.

In more details in subsequent iterations of step 132, an updated set of potentially duplicate originating issue entries 64 are identified. This updated set is identified based on the user information provided by the user, which includes the initial user-provided information (i.e. the first set of user-provided information from the first iteration of step 124) and supplementary information provided by the user (i.e. the supplementary set of user-provided information from the subsequent iterations of step 124).

At least a subset of the updated set of potentially duplicate originating issue entries is displayed in the subsequent iterations of step 140. Once again, the information about at least the subset of the identified potentially duplicate originating issue is displayed within the user interface of the user portal of the collaborative issue tracking platform 48, such that the identified potentially duplicate originating issue entries are made available for selection by the user using the user interface of the user portal of the collaborative issue tracking platform 48.

On subsequent iterations of step 156, it is further determined whether a selection of one originating issue entry 64 from the updated set of potentially duplicate originating issue entries has been received from the user portal of the collaborative issue tracking platform 148.

Steps 124, 132, 140 and 156, are repeated to receive further information provided by the first user (step 124), update the search for potentially duplicate originating issue entries (step 132), display the search results (step 140) and whether a selection of one originating issue entry 64 from the updated set of potentially duplicate originating issue entries has been received from the user portal of the collaborative issue tracking platform, until it is determined at step 148 that submission of information for the issue being reported is complete.

If it is determined at step 148 that submission of information for the issue being reported is complete, the method 100 moves to step 188. This represents a situation where the issue being reported is not a duplicate of any of the issues represented in the potentially duplicate originating issues identified and presented at steps 132 and 140. At step 188, the temporary issue entry, which now stores a complete set of information for the issue to be reported by the user, is stored as a new originating issue entry 64 within the originating issue database 56. This can include creating the new originating issue entry 64 and storing the temporary issue entry as a top-level contribution sub-entry **72*a* in the new originating issue entry 64. The new originating issue entry 64 that is created at step 188 is non-associated with any other originating issue entries already stored in the originating issue database 56—the new originating issue entry 64** thereby representing a new issue in the software application that has not yet been reported.

Figure 5:
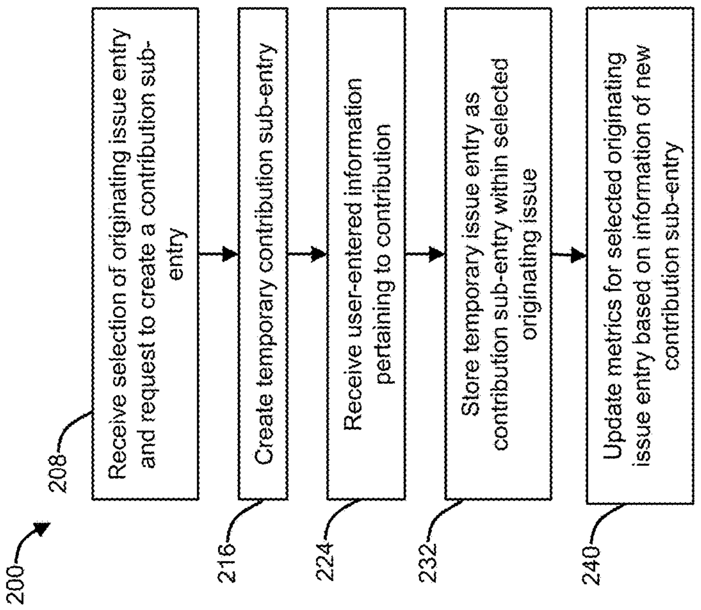
FIG. 5 illustrates a flowchart showing the operational steps for contributing to an existing originating issue in the collaborative issue tracking method according to the example embodiment.

Referring now to FIG. 5, there is illustrated is a flowchart showing the operational steps of a method 200 for contributing to an existing originating issue entry 64 according to an example embodiment. Method 200 is carried out in a situation where the issue is reported as a result of a selection of an existing reported issues stored in originating issue entries 64 of the originating issue database 56. For example, and without being limitative, the selection can be performed following browsing of existing reported issues, via a portal provided by the collaborative issue tracking platform 48, with the user desiring to submit details regarding this existing originating issue entry 64.

At step 208, a selection of an originating issue entry 64 is received along with a request to create a new contribution sub-entry **72*b* for the selected originating issue entry 64. The selection is referred herein as a for-contribution selection of the selected originating issue entry 64**.

At step 216, in response to receiving the request to create a new contribution sub-entry 72, a temporary contribution sub-entry is temporarily created.

At step 224 a set of for-contribution user-provided information pertaining to the new contribution sub-entry 72*b* for the selected originating issue entry 64 is received. Once again, for this step, one or more data entry pages can be presented to the first user, as he/she is navigating the portal presented by the collaborative issue tracking platform 48, using the computing device. The user can provide the information via date entry forms, fields, menus, or the like presented on the data entry pages. One skilled in the art will understand that the user-provided information can correspond to the issue parameters 80 that will ultimately be stored within the originating issue database 56.

In an embodiment, the set of for-contribution user-provided information can include a validation of the selected originating issue entry 64 or an invalidation of the given one of the selected originating issue entry 64.

At step 232, upon receiving the for-contribution user-provided information pertaining to the new contribution sub-entry 72*b* for the selected originating issue entry 64, the temporary contribution sub-entry is stored in the originating issue database 56 as a new subsequent contribution sub-entry 72*b* within the originating issue entry 64 selected by the user at step 208.

Optionally, at step 240, issue-related metrics for the selected originating issue entry 64 can be updated to take into account the information contained in the new contribution sub-entry 72 that was stored at step 232.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A method for collaborative tracking of issues in a software development process, the method comprising:

receiving, from a first user, a request for submitting a new development issue;

in response to the request:

creating a temporary issue entry;

receiving, from the first user, a first set of user-provided information pertaining to the new development issue;

storing the first set of user-provided information within the temporary issue entry; in response to receiving and storing the first set of user-provided information pertaining to the new development issue, performing a search in the originating issue database to identify a first set of potentially duplicate originating issue entries by comparing the first set of user-provided information to issue parameters of existing originating issue entries stored in the originating issue database to determine their similarity, wherein the originating issue database being a structured database with an internal structure including fields for storing originating issue entries, top level issue sub-entries, contribution sub entries and issue parameters, where each originating issue can be associated to one top level issue sub-entry and one or more contribution sub entries, each being associated to issue parameters defined by the user-provided information and where each originating issue entry corresponds to a non-duplicated previously identified development issue previously reported by users, and each potentially duplicate originating issue entry represent a potential duplicate of the new development issue defined by their similarity with the first set of user-provided information;

selecting one of the first set of potentially duplicate originating entries, and in response to the selecting of the one of the first set of potentially duplicate originating entries, storing, in the originating issue database, the temporary issue entry as a new contribution sub-entry of the selected originating issue entry.

2. The method of claim 1, further comprising:

receiving, from the first user, a supplementary set of user-provided information pertaining to the new development issue;

storing the supplementary set of user-provided information within the temporary issue entry; in response to receiving the supplementary set of user-provided information pertaining to the new development issue, determining, from the originating issue database, an updated set of potentially duplicate originating issue entries, each potentially duplicate originating issue entry of the updated set representing a potential duplicate of the new development issue defined by a combination of the first set of user-provided information and the supplementary set of user-provided information.

3. The method of claim 1, further comprising:

determining, for the selected given one of the potentially duplicate originating issue entries, an issue metric based on the issue parameters entries defined by the user-provided information stored in the new contribution sub-entry of the originating issue database and on one or more of issue parameters entries defined by the user-provided information associated to other contribution sub-entries of the originating issue database and to the top level issue sub-entry of the originating issue database, for the corresponding originating issue entry.

4. The method of claim 1, further comprising:

if a complete set of user-provided information pertaining to the new development issue is received without receiving a selection of one of the potentially duplicate originating issue entries, storing, in the originating issue database, the temporary issue entry as a top-level issue entry of a new originating issue entry with the new originating issue entry being unassociated with any other originating issue entries of the originating issue database.

5. The method of claim 1, further comprising:

receiving, from a second user, a for-contribution selection of a given one of the originating issue entries stored in the originating issue database and a request to make a contribution to the for-contribution selected originating issue entry;

in response to the request to make the contribution, creating a contribution sub-entry within the for-contribution selected given one of the originating issue entry in the originating issue database;

receiving and storing a set of for-contribution user-provided information pertaining to the contribution as issue parameter entries, within the newly created contribution sub-entry.

6. The method of claim 5, further comprising determining, for the for-contribution selected given one of the originating issue entry, an issue metric based on the issue parameters entries defined by the user-provided information stored in the new contribution sub-entry of the originating issue database, and on one or more of issue parameters entries defined by the user-provided information associated to other contribution sub-entries of the originating issue database and to the top level issue sub-entry of the originating issue database, for the corresponding originating issue entry.

7. The method of claim 5, wherein the set of for-contribution user-provided information pertaining to the contribution for the given one of the originating issue entries includes one of a validation of the given one of the originating issue entries or an invalidation of the given one of the originating issue entries.

8. A system for collaborative tracking of issues in a software development process, the system comprising:

at least one processor;

at least one memory coupled to the processor and storing statements and instructions executable by the processor, which when executed by the processor causes the processor to perform operations comprising:

receiving, from a first user, a request for submitting a new development issue;

in response to the request, creating a temporary issue entry;

receiving, from the first user, a first set of user-provided information pertaining to the new development issue;

storing the first set of user-provided information within the temporary issue entry;

in response to receiving and storing the first set of user-provided information pertaining to the new development issue, performing a search in the originating issue database to identify a first set of potentially duplicate originating issue entries by comparing the first set of user-provided information to issue parameters of existing originating issue entries stored in the originating issue database to determine their similarity, wherein the originating issue database being a structured database with an internal structure including fields for storing originating issue entries, top level issue sub-entries, contribution sub entries and issue parameters, where each originating issue can be associated to one top level issue sub-entry and one or more contribution sub entries, each being associated to issue parameters defined by the user-provided information and where each originating issue entry corresponds to a non-duplicated previously identified development issue previously reported by users, and each potentially duplicate originating issue entry represent a potential duplicate of the new development issue defined by their similarity with the first set of user-provided information;

selecting one of the first set of potentially duplicate originating entries, and in response to the selecting of the one of the first set of potentially duplicate originating entries, storing, in the originating issue database, the temporary issue entry as a new contribution sub-entry of the selected originating issue entry.

9. The system of claim 8, wherein the at least one memory coupled to the processor stores statements and instructions executable by the processor, which when executed by the processor causes the processor to further perform operations comprising:

receiving, from the first user, a supplementary set of user-provided information pertaining to the new development issue;

storing the supplementary set of user-provided information within the temporary issue entry;

in response to receiving the supplementary set of user-provided information pertaining to the new development issue, determining, from the originating issue database, an updated set of potentially duplicate originating issue entries, each potentially duplicate originating issue entry of the updated set representing a potential duplicate of the new development issue defined by a combination of the first set of user-provided information and the supplementary set of user-provided information.

10. The system of claim 8, wherein the at least one memory coupled to the processor stores statements and instructions executable by the processor, which when executed by the processor causes the processor to further perform operations comprising:

determining, for the selected given one of the potentially duplicate originating issue entries, an issue metric based on the issue parameters entries defined by the user-provided information stored in the new contribution sub-entry of the originating issue database and on one or more of issue parameters entries defined by the user-provided information associated to other contribution sub-entries of the originating issue database and to the top level issue sub-entry of the originating issue database, for the corresponding originating issue entry.

11. The system of claim 8, wherein the at least one memory coupled to the processor stores statements and instructions executable by the processor, which when executed by the processor causes the processor to further perform operations comprising:

if a complete set of user-provided information pertaining to the new development issue is received without receiving a selection of one of the potentially duplicate originating issue entries, storing, in the originating issue database, the temporary issue entry as a top-level issue entry of a new originating issue entry.

12. The system of claim 8, wherein the at least one memory coupled to the processor stores statements and instructions executable by the processor, which when executed by the processor causes the processor to further perform operations comprising:

receiving, from a second user, a for-contribution selection of a given one of the originating issue entries stored in the originating issue database and a request to make a contribution to the for-contribution selected originating issue entry;

in response to the request to make the contribution, creating a contribution sub-entry within the for-contribution selected given one of the originating issue entry in the originating issue database;

receiving and storing a set of for-contribution user-provided information pertaining to the contribution as issue parameter entries, within the newly created contribution sub-entry.

13. The system of claim 12, wherein the at least one memory coupled to the processor stores statements and instructions executable by the processor, which when executed by the processor causes the processor to further perform operations comprising:

determining, for the for-contribution selected given one of the originating issue entry, an issue metric based on the issue parameters entries defined by the user-provided information stored in the new contribution sub-entry of the originating issue database, and on one or more of issue parameters entries defined by the user-provided information associated to other contribution sub-entries of the originating issue database and to the top level issue sub-entry of the originating issue database, for the corresponding originating issue entry.

14. The system of claim 12, wherein the set of for-contribution user-provided information pertaining to the contribution for the given one of the originating issue entries includes one of a validation of the given one of the originating issue entries or an invalidation of the given one of the originating issue entries.

15. A system for collaborative tracking of issues in a software development process, the system comprising:

a collaborative issue tracking platform;

a originating issue database being a structured database with an internal structure including fields for storing originating issue entries, top level issue sub-entries, contribution sub entries and issue parameters, where each originating issue can be associated to one top level issue sub-entry and one or more contribution sub entries, each being associated to issue parameters defined by user-provided information, each originating issue entry corresponding to a non-duplicated previously identified development issue previously reported by users, and;

wherein the collaborative issue tracking platform is configured to:

receive a request for submitting a new development issue;

in response to the request, create a temporary issue entry;

receive a first set of user-provided information pertaining to the new development issue;

store the first set of user-provided information within the temporary issue entry;

in response to receiving and storing the first set of user-provided information pertaining to the new development issue, perform a search in the originating issue database to identify a first set of potentially duplicate originating issue entries by comparing the first set of user-provided information to issue parameters of existing originating issue entries stored in the originating issue database to determine their similarity, each potentially duplicate originating issue entry representing a potential duplicate of the new development issue defined by their similarity with the first set of user-provided information;

select if one of the first set of potentially duplicate originating entries, and in response to the selected one of the first set of potentially duplicate originating entries, store in the originating issue database the temporary issue entry as a new contribution sub-entry of the selected originating issue entry.

16. The system of claim 15, wherein the collaborative issue tracking platform is further configured to:

receive a supplementary set of user-provided information pertaining to the new development issue;

store the supplementary set of user-provided information within the temporary issue entry;

in response to receiving the supplementary set of user-provided information pertaining to the new development issue, determine, from the originating issue database, an updated set of potentially duplicate originating issue entries, each potentially duplicate originating issue entry of the updated set representing a potential duplicate of the new development issue defined by a combination of the first set of user-provided information and the supplementary set of user-provided information, and if a selection of a given one of the new set of potentially duplicate originating entries is received, store in the originating issue database the temporary issue entry as a new contribution sub-entry of the given selected originating issue entry of the new set of potentially duplicate originating entries.

17. The system of claim 15, wherein the collaborative issue tracking platform is further configured to:

determine, for the selected given one of the potentially duplicate originating issue entries, an issue metric based on the issue parameters entries defined by the user-provided information stored in the new contribution sub-entry of the originating issue database and on one or more of issue parameters entries defined by the user-provided information associated to other contribution sub-entries of the originating issue database and to the top level issue sub-entry of the originating issue database, for the corresponding originating issue entry.

18. The system of claim 15, wherein the collaborative issue tracking platform is further configured to:

if a complete set of user-provided information pertaining to the new development issue is received without receiving a selection of one of the potentially duplicate originating issue entries, store in the originating issue database the temporary issue entry as a top-level issue entry of a new originating issue entry.

19. The system of claim 15, wherein the collaborative issue tracking platform is further configured to:

receive a for-contribution selection of a given one of the originating issue entries stored in the originating issue database and a request to make a contribution to the for-contribution selected originating issue entry;

in response to the request to make the contribution, create a contribution sub-entry within the for-contribution selected given one of the originating issue entry in the originating issue database; receive and store a set of for-contribution user-provided information pertaining to the contribution as issue parameter entries, within the newly created contribution sub-entry, the set of for-contribution user-provided information pertaining to the contribution for the given one of the originating issue entries including one of a validation of the given one of the originating issue entries or an invalidation of the given one of the originating issue entries; and determine, for the for-contribution selected given one of the originating issue entry, an issue metric based on the issue parameters entries defined by the user-provided information stored in the new contribution sub-entry of the originating issue database, and on one or more of issue parameters entries defined by the user-provided information associated to other contribution sub-entries of the originating issue database and to the top level issue sub-entry of the originating issue database, for the corresponding originating issue entry.

* * * * *